Nov. 9, 1954 P. SCHLUMBOHM 2,693,883
FILTER PAPER BLANK
Filed April 3, 1952

INVENTOR.

United States Patent Office 2,693,883
Patented Nov. 9, 1954

2,693,883
FILTER PAPER BLANK

Peter Schlumbohm, New York, N. Y.

Application April 3, 1952, Serial No. 280,275

1 Claim. (Cl. 210—203)

The present invention relates to filtration. More specifically the invention relates to the filtration of liquids by means of filterpaper.

While developing a filtering apparatus and filterpaper for filtering coffee I was, as manufacturer, faced with the problem of designing a coffeemaker which, at the time of coffee rationing, would operate even with small quantities of coffee. I created at that time the 30° funnel in contrast to the usual 60° funnel. In such a 30° funnel a given mass of coffee grounds forms a higher column than the same mass would form in a 60° funnel. This arrangement offers better conditions for extracting the coffee when water is added.

In later years I have applied the 30° funnel also to large size coffeemakers, such as for producing 20 cups, because I felt that in general a 30° funnel offers a better extraction and a speedier filtration than a 60° funnel.

While the filterpaper cone for a 60° funnel is created by folding a circle of filterpaper twice to produce four layers, this 30° funnel requires an additional fold to produce eight layers. By opening these eight layers into a cone with either three layers on one side and five layers on the other side, or with one layer on one side and seven layers on the other side, a suitable filterpaper cone was created for the 30° funnel.

Figure 5:
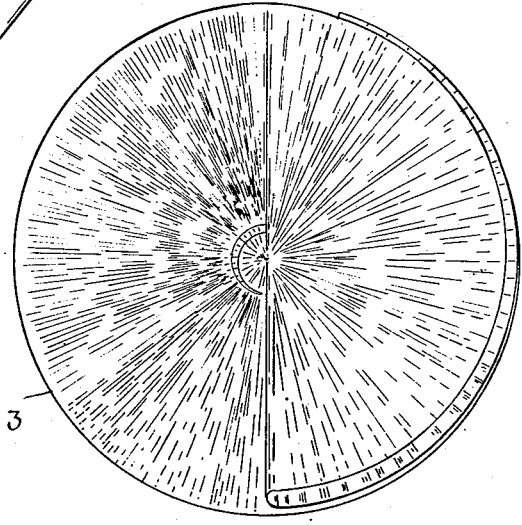
Figure 6:
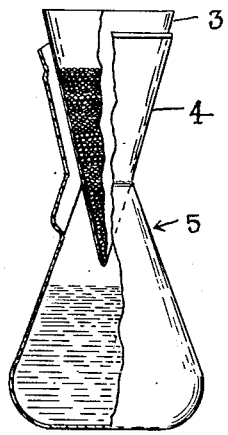

I am now offering the following invention as improvement of the operation of a 30° funnel. The invention is shown by way of example in the Figures 1 to 6 of the accompanying drawings. Figure 1 to Figure 4 show the folds required for producing the filterpaper cone. Figure 5 shows a top view into the opened filterpaper cone. Figure 6 shows in side elevation, partly broken away, a filterpot with a 30° funnel and with the newly-formed cone of Figure 5 inserted in said funnel.

Figure 1:
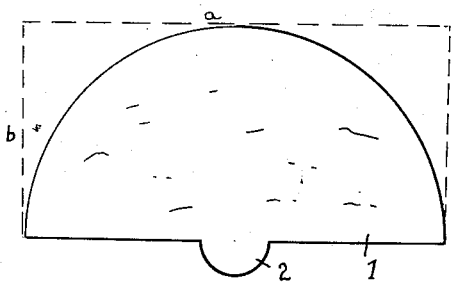

As shown in Figure 1, I offer to the public to buy a new die-cut sheet of filterpaper which is no longer the full circle but comprises a half circle 1 with a tongue-like center extension 2. This tongue 2 is quasi the only part left of the missing other half of the circle. The folding practice, therefore, remains basically unchanged from the practice of folding the full circle.

Figure 2:
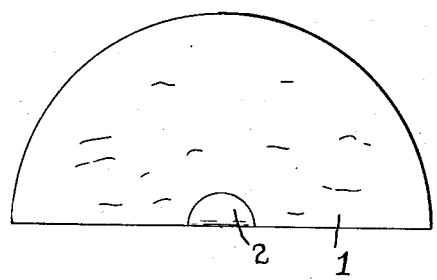

As shown in Figure 2, the first fold consists of folding over the tongue 2.

Figure 3:
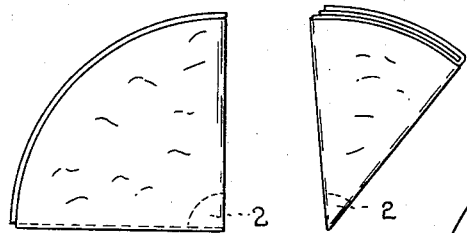

As shown in Figure 3, the second fold produces four layers in the zone of the tongue 2 but only two layers in the remaining zone of the half circle.

Figure 4:
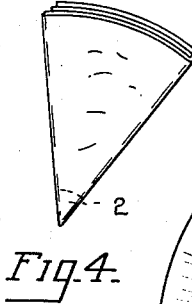

As shown in Figure 4, the third fold creates eight layers in the zone of tongue 2 and four layers for the remaining part of the half circle.

As shown in Figure 5, the multiple layers of Figure 4 are opened into a 30° cone 3 in which the tongue 2 seals the tip while of the remaining half circle three layers are arranged on one side and one layer on the other.

Figure 6 illustrates the 30° cone 3 inserted in the 30° funnel 4 of the filter-pot 5.

It is a special advantage of the invention that the apex of the filterpaper cone is left unchanged. Thus the full hydrostatic column of the liquid above the apex can be brought to effect for an optimal speed of filtration.

The shape of the tongue 2 may be varied and the shape shown in the drawings is an example. What is required is an extension of the paper beyond the center line of the mathematical full circle, this extension to be in the center zone of said mathematical full circle.

The center line of this imaginary, mathematical circle is thus clearly marked by the edge of the adjacent, non-extended part and serves as an optical guide for folding the blank.

Having now described the nature of my invention and shown by way of examples the manner in which it may be performed, I claim as my invention:

An integral filterpaper blank for folding into an approximately 30° funnel, characterized by a main section congruent with half of a mathematical circle having a radius equal to the side length of the folded funnel, and by a smaller section which extends in the center zone of said circle symmetrically into the other half of said circle, whereby the center line of said circle is clearly marked by the edge of the adjacent, non-extended part of the main section, to serve as an optical guide for folding the blank.

References Cited in the file of this patent
UNITED STATES PATENTS

| Number | Name | Date |
|---|---|---|
| 1,053,272 | Brady | Feb. 18, 1913 |
| 2,021,950 | Thomas | Nov. 26, 1935 |
| 2,045,746 | Allison | June 30, 1936 |
| 2,171,484 | Squire | Aug. 29, 1939 |
| 2,234,397 | Bentz | Mar. 11, 1941 |
| 2,349,115 | Sanford | May 16, 1944 |

FOREIGN PATENTS

| Number | Country | Date |
|---|---|---|
| 172,948 | Switzerland | Feb. 1, 1935 |
| 244,009 | Switzerland | Feb. 17, 1947 |
| 847,817 | France | Oct. 17, 1939 |